US007908791B1

(12) United States Patent
Brash

(10) Patent No.: US 7,908,791 B1
(45) Date of Patent: Mar. 22, 2011

(54) FUMIGATION APPARATUS

(75) Inventor: Kenneth George Brash, Wombarra (AU)

(73) Assignee: Asiaworld Shipping Services Pty Ltd, Artarmon (AU)

( * ) Notice: Subject to any disclaimer, the term of this patent is extended or adjusted under 35 U.S.C. 154(b) by 0 days.

(21) Appl. No.: 09/980,676

(22) PCT Filed: Apr. 19, 2000

(86) PCT No.: PCT/AU00/00336
§ 371 (c)(1),
(2), (4) Date: May 9, 2002

(87) PCT Pub. No.: WO00/62607
PCT Pub. Date: Oct. 26, 2000

(30) Foreign Application Priority Data

Apr. 20, 1999 (AU) .......................................... PP9857
Sep. 7, 1999 (AU) .................................... 47412/99

(51) Int. Cl.
*A01M 13/00* (2006.01)
*A01M 1/20* (2006.01)
(52) U.S. Cl. ........................................... 43/125; 43/129
(58) Field of Classification Search .................... 43/125, 43/129, 130, 124, 132.1; 422/32, 305; 426/312, 426/319, 320, 419
See application file for complete search history.

(56) References Cited

U.S. PATENT DOCUMENTS

| 1,849,194 | A | * | 3/1932 | McCurrie | 43/125 |
| 3,736,792 | A | * | 6/1973 | Poulsen | 73/25.03 |
| 3,811,579 | A | * | 5/1974 | Black | 414/347 |
| 4,018,704 | A | * | 4/1977 | Kuragano | 502/35 |
| 4,215,508 | A | * | 8/1980 | Allen et al. | 43/125 |
| 4,716,676 | A | * | 1/1988 | Imagawa | 43/130 |
| 4,748,013 | A | * | 5/1988 | Saito et al. | 423/241 |
| 4,892,456 | A | * | 1/1990 | Hodgetts | 414/527 |
| 4,961,283 | A | * | 10/1990 | Forbes | 43/132.1 |
| 4,966,755 | A | * | 10/1990 | Smith | 43/125 |
| 4,989,363 | A | * | 2/1991 | Doernemann | 43/132.1 |
| 5,055,277 | A | * | 10/1991 | Gunn | 422/28 |
| 5,194,147 | A | * | 3/1993 | Augustine et al. | 210/151 |
| 5,203,108 | A | * | 4/1993 | Washburn, Jr. | 43/132.1 |
| 5,312,034 | A | * | 5/1994 | Nakagawa et al. | 229/120 |
| 5,318,789 | A | * | 6/1994 | Nakagawa et al. | 426/316 |
| 5,417,921 | A | * | 5/1995 | Dove et al. | 422/30 |
| 5,436,268 | A | * | 7/1995 | Ohama et al. | 514/514 |
| 5,505,908 | A | * | 4/1996 | Nagji | 422/31 |
| 5,556,595 | A | * | 9/1996 | Suzuki et al. | 422/32 |
| 5,565,178 | A | * | 10/1996 | Dove et al. | 422/181 |
| 5,607,652 | A | * | 3/1997 | Hellmuth et al. | 422/300 |
| 5,678,352 | A | * | 10/1997 | Leitner et al. | 43/125 |

(Continued)

FOREIGN PATENT DOCUMENTS

AU   A-32801/95   4/1996

(Continued)

*Primary Examiner* — Darren W Ark
(74) *Attorney, Agent, or Firm* — Fitch, Even, Tabin & Flannery

(57) ABSTRACT

A fumigation apparatus including a conventional shipping container (10), a partition (14) dividing the container into a fumigation chamber and a control room (12), means (24) arranged to supply gas into the fumigation chamber (16), control means (26) located in the control room arranged to control the flow of gas into the fumigation chamber (16) and extraction means (36, 38, 40, 42, 44) arranged to remove gas from the fumigation chamber as controlled from the system control box (26).

17 Claims, 3 Drawing Sheets

U.S. PATENT DOCUMENTS

| | | | | |
|---|---|---|---|---|
| 5,791,150 A | * | 8/1998 | Bosher et al. | 62/62 |
| 5,792,419 A | * | 8/1998 | Williamson et al. | 43/124 |
| 5,904,909 A | * | 5/1999 | Yates et al. | 422/32 |
| 5,932,172 A | | 8/1999 | Winks | 43/125 |
| 5,965,185 A | * | 10/1999 | Bianco | 426/449 |
| 6,047,496 A | * | 4/2000 | Leitner et al. | 43/125 |
| 6,047,497 A | * | 4/2000 | Smithyman et al. | 43/125 |
| 6,051,198 A | * | 4/2000 | Sano et al. | 423/240 S |
| 6,146,600 A | | 11/2000 | Williamson | 43/124 |
| 6,171,561 B1 | * | 1/2001 | Williamson et al. | 43/124 |
| 6,227,002 B1 | * | 5/2001 | Bianco et al. | 62/302 |
| 6,279,261 B1 | * | 8/2001 | Binker et al. | 43/125 |
| 6,447,737 B1 | * | 9/2002 | Williamson et al. | 43/124 |
| 6,462,250 B1 | * | 10/2002 | Kuriyama et al. | 588/306 |
| 6,513,282 B2 | * | 2/2003 | Schott et al. | 43/125 |
| 6,588,140 B1 | * | 7/2003 | Johnson et al. | 43/132.1 |
| 6,612,067 B2 | * | 9/2003 | Topp | 43/124 |
| 6,615,534 B1 | * | 9/2003 | Smithyman et al. | 43/125 |
| 6,941,727 B2 | * | 9/2005 | Villers et al. | 53/434 |
| 6,955,786 B2 | * | 10/2005 | Carman et al. | 422/32 |
| 7,090,812 B2 | * | 8/2006 | Joyce et al. | 422/177 |
| 7,311,743 B2 | * | 12/2007 | Deshusses | 210/602 |
| 7,682,560 B2 | * | 3/2010 | Brash | 43/125 |
| 2001/0034963 A1 | * | 11/2001 | Jones | 43/124 |
| 2003/0026727 A1 | * | 2/2003 | Topp | 43/124 |
| 2003/0118474 A1 | * | 6/2003 | Brash | 422/32 |
| 2004/0035044 A1 | * | 2/2004 | Topp | 43/124 |
| 2005/0108920 A1 | * | 5/2005 | Takenoshita et al. | 43/132.1 |
| 2006/0010791 A1 | * | 1/2006 | Topp | 422/307 |
| 2006/0086038 A1 | * | 4/2006 | Mosher | 43/124 |
| 2006/0088462 A1 | * | 4/2006 | Joyce et al. | 422/231 |
| 2007/0084105 A1 | * | 4/2007 | Lindsay et al. | 43/125 |
| 2007/0163435 A1 | * | 7/2007 | Brash | 95/90 |
| 2007/0283986 A1 | * | 12/2007 | Baum | 43/124 |
| 2008/0107563 A1 | * | 5/2008 | Ivanine et al. | 422/30 |
| 2008/0146137 A1 | * | 6/2008 | Mosunic | 454/118 |
| 2008/0251514 A1 | * | 10/2008 | Fitzpatrick et al. | 43/125 |
| 2008/0257893 A1 | * | 10/2008 | Podd et al. | 220/562 |
| 2008/0257894 A1 | * | 10/2008 | Podd et al. | 220/565 |
| 2009/0211148 A1 | * | 8/2009 | McCarty | 43/124 |
| 2009/0272024 A1 | * | 11/2009 | Rogacki et al. | 43/125 |

FOREIGN PATENT DOCUMENTS

| | | | |
|---|---|---|---|
| CA | 2038328 | | 9/1992 |
| DE | 132 809 | | 11/1978 |
| DE | 4134093 A1 | * | 4/1993 |
| DE | 4428915 A1 | * | 2/1996 |
| DE | 19506200 A1 | * | 8/1996 |
| DE | 19744939 A1 | * | 4/1999 |
| DE | 19936417 A1 | * | 2/2001 |
| DE | 19950634 C1 | * | 5/2001 |
| DE | 10301570 A1 | * | 8/2004 |
| EP | 626190 A1 | * | 11/1994 |
| JP | 72017988 B | * | 5/1972 |
| JP | 58024319 A | * | 2/1983 |
| JP | 01030532 A | * | 2/1989 |
| JP | 02-013341 A | | 1/1990 |
| JP | 02013341 | | 1/1990 |
| JP | 02219535 | | 9/1990 |
| JP | 02-303442 A | | 12/1990 |
| JP | 02303442 A | * | 12/1990 |
| JP | 05236857 A | * | 9/1993 |
| JP | 08024572 A | * | 1/1996 |
| JP | 08-322449 A | | 12/1996 |
| JP | 08322449 A | * | 12/1996 |
| JP | 09-249288 | | 9/1997 |
| JP | 10052625 A | * | 2/1998 |
| JP | 10151320 A | * | 6/1998 |
| JP | 10156139 | | 6/1998 |
| JP | 10156139 A | * | 6/1998 |
| JP | 2000300144 A | * | 10/2000 |
| JP | 2007143410 A | * | 6/2007 |
| JP | 2007259861 A | * | 10/2007 |

\* cited by examiner

# FUMIGATION APPARATUS

FIELD OF THE INVENTION

The present invention relates generally to a fumigation apparatus. The invention will primarily be described with reference to its use to provide fumigation of timber dunnage and other waste shipping cargo packaging material, but it should be realised that the invention can have broader applications to any other bulk materials, goods or produce which may contain pests or insects or other vermin and which therefore require fumigation.

BACKGROUND TO THE INVENTION

Large quantities of timber and packing materials are carried all over the world in ships and such goods remain largely useless at the point of arrival of the ship due to the likelihood of it containing pests, parasites, insects or other vermin from another country, such as for example borers, lice, ticks, fleas or termites. It is best that the timber dunnage and other bulk materials do not have to leave the confines of the wharf or port vicinity to travel to a distant site for effective treatment, since this would pose an environmental exposure risk.

Fumigation devices for bulk materials are known in the art that involve placement of a heavy, impervious blanket or other covering article over the materials followed by subsequent addition of toxic gas flow under the blanket to fumigate the covered goods. Current methods of fumigation under blankets are crude, ineffective at fully eliminating insect infestation since no mixing of gases with dunnage can occur, and highly dangerous from an occupational health standpoint since the gases used for effective fumigation are extremely toxic.

U.S. Pat. No. 5,318,789 relates generally to a method for fumigating produce and in particular fruit. U.S. Pat. No. 5,318,789 describes the specific construction of a vented container in which the fruit is packed in preparation for fumigation. The vented fruit containers are stacked in a purpose-built fumigation chamber of a fumigation facility and the fruit fumigated with a gaseous fumigant. The fruit containers are then transported out of the fumigation facility either to a cold storage area of a packing house or directly to shipment vehicles.

SUMMARY OF THE INVENTION

According to one aspect of the present invention there is provided a fumigation apparatus including:

a conventional shipping container which at least in part defines a fumigation chamber being adapted to contain produce to be fumigated, and mobile fumigation means operatively coupled to the conventional shipping container, the mobile fumigation means including:

fumigant inlet means operatively coupled to the container to allow a flow of a fumigant into the fumigation chamber;

extraction means also being operatively coupled to the container to remove a majority of the fumigant from the fumigation chamber; and absorption means being operatively coupled to the extraction means, the absorption means being designed to absorb substantially all of the fumigant extracted from the fumigation chamber.

Preferably the mobile fumigation means is defined by a shipping container. Typically the fumigation chamber is a pair of shipping containers positioned alongside one another each operatively coupled to the mobile fumigation means. Alternatively the mobile fumigation means is defined by a partition wall in the shipping container, the wall separating the mobile fumigation means and the fumigation chamber.

Preferably the fumigation apparatus further includes control means operatively coupled to the shipping container and arranged to control the flow of fumigant into the container. Typically the mobile fumigation means is a control room in which the control means is located.

Preferably the partition wall and/or the shipping container fumigation chamber itself is secure against the passage of the fumigant. This means that toxic gases from the process in the fumigation chamber will not pose any occupational health risk to operators of the fumigation apparatus during processing, while they may be standing in the adjacent control room. It also provides an all weather secure location for associated control equipment.

Preferably the absorption means comprises an absorption bed including activated carbon to which at least part of the extracted fumigant attaches.

Typically the fumigation apparatus also comprises a sliding bed or floor on which the produce resides, said bed or floor being configured to slide into and out of the fumigation chamber wherein loading and unloading of the produce to be fumigated can be performed externally of said chamber.

Preferably the control room incorporates a source of the fumigant which is preferably directly associated with a heating source, the latter used to convert the fumigant into a gaseous form. The heat energy transferred to the fumigant should be such that it becomes more buoyant than ambient air. In another variant the fumigation apparatus has a source of the fumigant and a heating source which are contained in an appropriate storage box which is secure against the passage of gases. Alternatively the fumigant inlet means is adapted to detachably couple to a mobile source of the fumigant such as a motor vehicle on which a fumigant vessel is mounted.

Preferably the control room incorporates a system control box and a system of fumigant delivery pipes and valves adapted in use to supply fumigant from the supply source to the fumigation chamber.

Preferably the fumigation chamber has openable doors in the container, the end doors when closed being secure against the passage of fumigant and further being fitted with external locking cam devices adapted to be secured with a latch and pin arrangement. More preferably the sliding bed or floor of the fumigation apparatus facilitates loading and removal of produce for fumigation via the end doors.

Preferably the fumigant inlet means includes a dispersion pipe system located in the upper part of the fumigation chamber. Such an arrangement allows the fumigant, which is generally heavier than air, to fall in a dispersed fashion downward over the top of the produce such as the timber and dunnage charge which has been loaded into the fumigation chamber.

Preferably the fumigation chamber is provided with a plurality of mixing fans adapted to circulate fumigant and gases within the chamber. Such an arrangement allows more even and thorough dispersion of the fumigant and gases as they enter and are dispersed in the fumigation chamber.

Preferably the extraction means includes a pipe attached to an orifice located in a lower region of a partition or a container wall, the pipe being connected in turn to an actuated butterfly valve further connected in turn to a contra-rotating fan adapted to provide suction for the extraction of the fumigant. More preferably the extraction means includes an exhaust stack positioned vertically above the fumigation container, the uppermost terminal of the exhaust stack being fitted with a gas diffuser and appropriate rain guard, and the exhaust stack being arranged to receive the stripped fumigant stream.

Preferably the fumigation chamber contains a plurality of small diameter floor and wall-mounted pipes independently connected via an appropriate system of taps and connectors to a fumigant sampling and detection meter unit located in the control room. More preferably the floor and wall-mounted pipes may be further adapted to be located in recessed grooves which may form part of the construction of the walls or floor of the container.

Preferably the control room includes a system control box which contains the fumigant sampling and detection meter unit and power supply switches for mixing fans, exhaust fan, lights, gas heaters and valve actuators.

In the preferred embodiment of the invention the fumigation apparatus is constructed using at least one conventional shipping container. Such a container is in all respects suitable for handling and use in the wharf or port vicinity. In fact, if available, effective fumigation of dunnage on site at the wharf by skilled operators would allow for the safe treatment and removal of this material for re-use as firewood or for building purposes, would eliminate the possibility of insects or vermin escaping into the environment, would speed up the fumigation processing rate and would provide some enhanced health and safety benefits.

According to another aspect of the invention there is provided a method of fumigating produce, the method comprising the steps of:

providing a fumigation apparatus including a conventional shipping container which at least in part defines a fumigation chamber and a mobile fumigation means operatively coupled to the container;

locating the produce to be fumigated in the fumigation chamber;

providing a flow of a fumigant to the fumigation chamber; extracting at least some of the fumigation from the chamber; and absorbing at least part of the fumigant extracted from the fumigation chamber.

Preferably the fumigant extracted from the chamber is absorbed on an absorption bed.

Typically the method of fumigating produce further comprises washing at least part of the absorption bed to remove the absorbed fumigant. More typically the absorption bed is washed with a scrubbing solution, such as sodium thiosulphate, to yield one or more salts, such as bromide and sodium methylthiosulphate.

Generally the fumigant includes an alkyl halide such as methyl bromide. The produce is usually timber.

BRIEF DESCRIPTION OF THE DRAWINGS

Notwithstanding any other forms which may fall within its scope, preferred forms of the invention will now be described, by way of example only, with reference to the accompanying drawings in which.

DETAILED DESCRIPTION OF THE PREFERRED EMBODIMENTS

Figure 1:
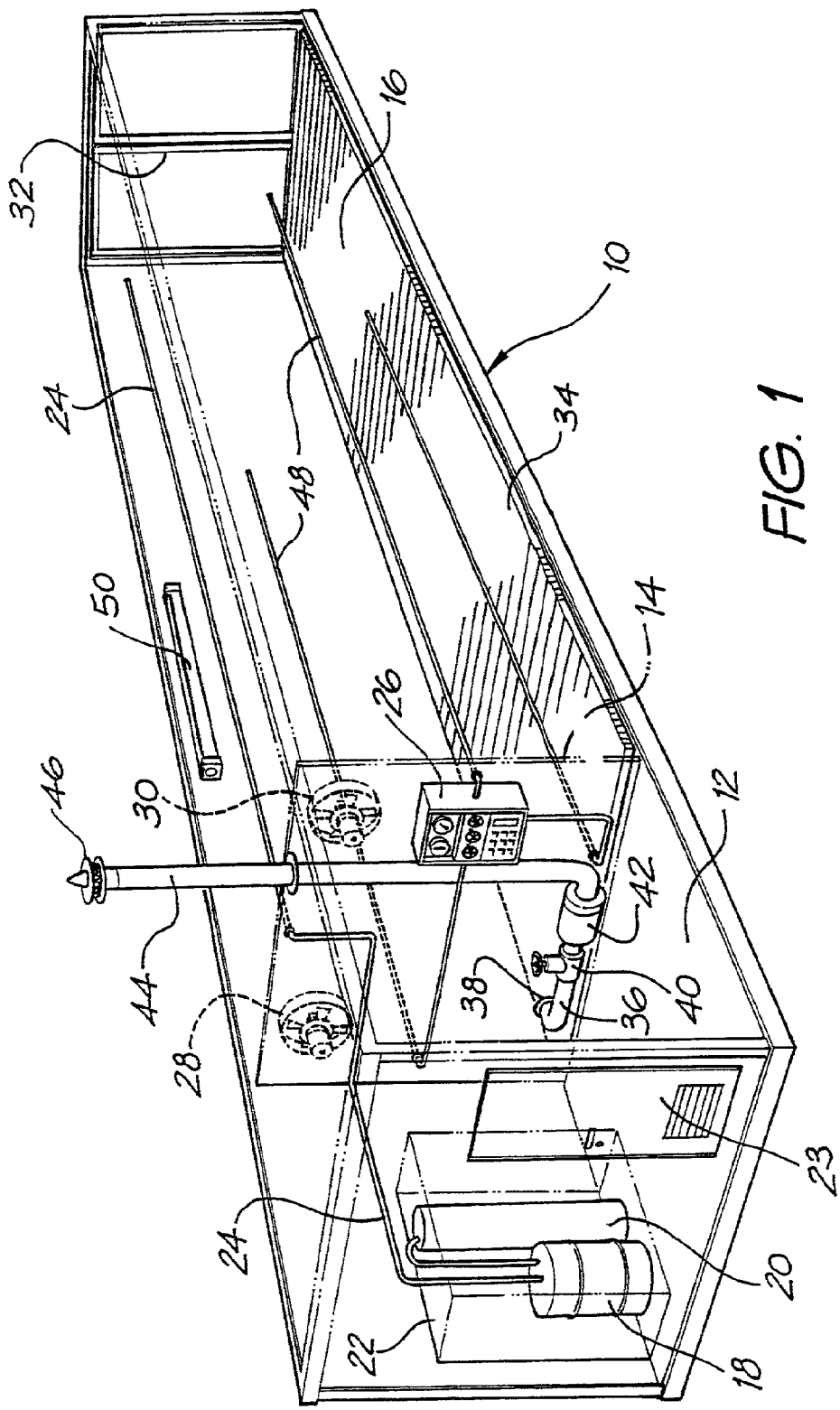
FIG. 1 shows a perspective schematic view of a shipping container fitted internally in accordance with one embodiment of the invention with a fumigation chamber and a control room.
Figure 2:
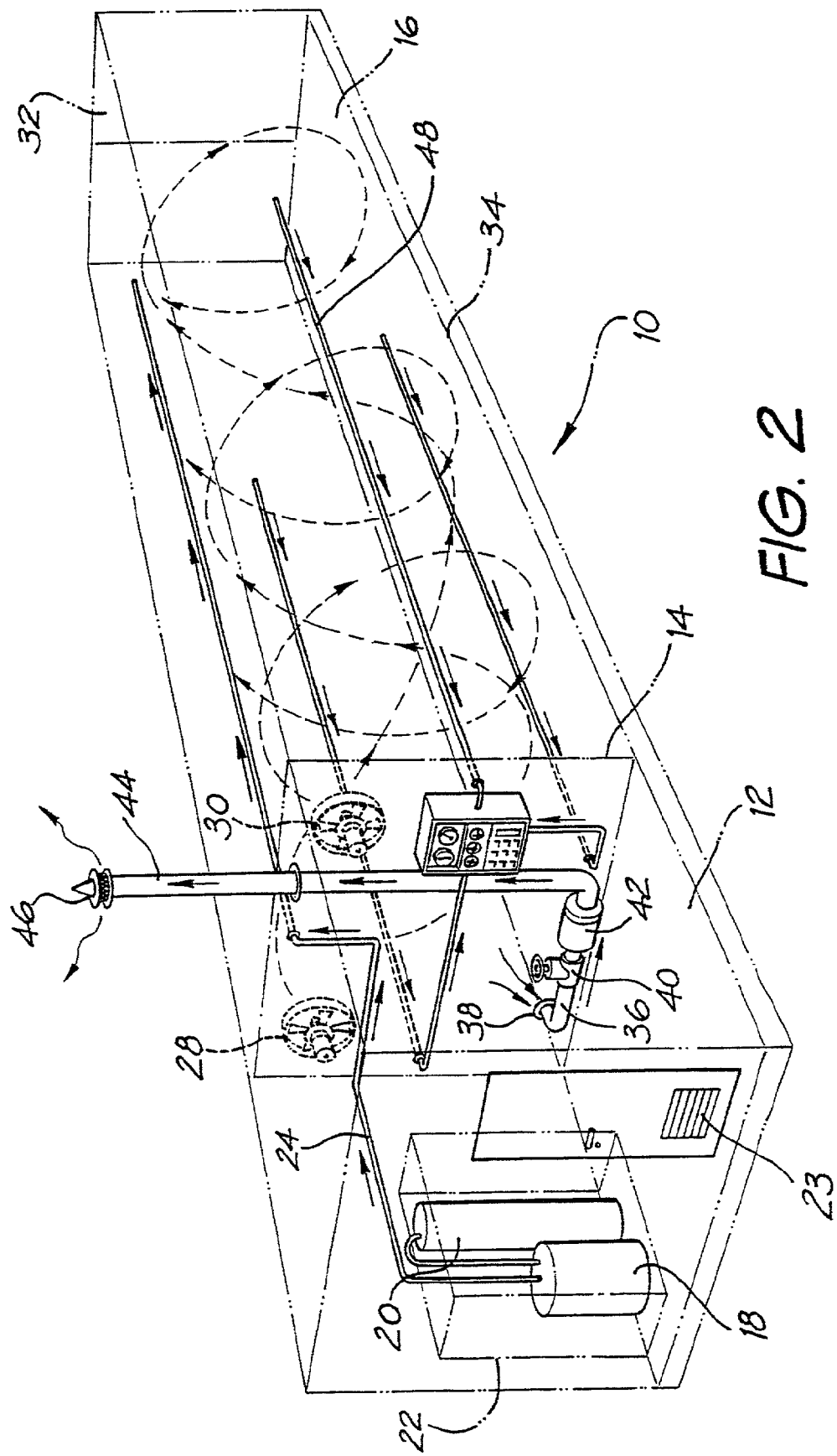
FIG. 2 is a similar view to FIG. 1 showing the flow direction of gas between process units.

As shown in FIGS. 1 and 2 there is one embodiment of a fumigation apparatus comprising a conventional shipping container 10, a partition wall 14 dividing the container 10 into a control room 12 and a fumigation chamber 16. The control room 12 contains a heating source 18 and a source of a liquified fumigation reagent 20 both items contained in a storage box 22 secure against the passage of gases. The control room also has a vented door 23 to provide external access. Piping means 24 exist for the supply and distribution of heated fumigant or in this example toxic gases directly to the fumigation chamber 16. Such an arrangement ensures firstly that the heavy toxic gas molecules, for example methyl bromide, are appropriately gasified and dispersed in air for transfer into the fumigation chamber 16. The gas-tight storage box 22 ensures that the toxic gases being fed to the fumigation process will not pose any occupational health risk to operators of the fumigation apparatus while those operators may be standing in the control room 12 during that period when the gas undergoes heating during processing.

The control room 12 contains a system control box 26 which functions to control the flow of toxic gas into the fumigation chamber 16. Such an arrangement ensures that at all times the availability of fumigation gases is able to be manually controlled which ensures that highly safe operating procedures can be maintained.

A nominal number of mixing fans, in this case two fans 28 and 30, circulate gases within the fumigation chamber 16 when operating. Mixing fans such as 28 and 30 located by appropriate wall-mountings on the partition wall 14 dividing the container 10 into a fumigation chamber 16 and a control room 12 would provide sufficient circulation to prevent the toxic gases, which are heavier than air, from only locating in the lower portion of the fumigation chamber 16.

Gas-tight end doors 32 provide access to the fumigation chamber 16 when it is not operating. A sliding bed or floor 34 is included in the container 10 to slide in and out of gas-tight end doors 32. Such an arrangement means that bulk quantities of large individual or odd-shaped pieces of timber and dunnage may be conveniently loaded into the fumigation chamber 16 because of the size of the doors 32 and the access provided by the sliding bed or floor 34. Conventional shipping containers such as 10 have gas-tight end doors 32 which makes them very suitable pieces of equipment in this regard.

Extraction means for evacuation of the fumigation chamber gases includes a pipe 36 attached to an orifice 38 located in the lower region of the partition 14, the pipe 36 in turn connected to an actuated butterfly valve 40 and a contra-rotating fan 42 and thence to a pipe exhaust stack 44. The uppermost terminal of the stack 44 is fitted with a gas diffuser and appropriate rain guard 46. Control of the actuated butterfly valve 40 and contra-rotating fan 42 are by means of system control box 26. Such an arrangement allows the toxic, heavier than air gases to be removed by fan induced suction from the fumigation chamber 16 at an appropriate lower height, where said gas molecules will naturally congregate without recirculation, followed by dispersion to the external atmosphere via a stack 44 which is of sufficient height to allow the gas contents of the fumigation chamber 16 to be safely vented without occupational health risk exposure to operators or others located nearby the fumigation apparatus.

A plurality of gas sampling lines 48 are mounted on both the walls and floor of the fumigation chamber 16 and connected via an appropriate system of pipes and connectors to a gas flow meter test unit located within system control box 26. Such an arrangement provides a gas sampling system which is connected in use to a gas flow meter test unit which draws small amounts of the gaseous contents of the fumigation chamber 16 and delivers a reading as to the concentration of toxic gas remaining in the fumigation chamber 16 during the venting procedure. This monitoring is carried out to ensure that the main fumigation chamber doors 32 may be safely opened for the purposes of removing the charged timber and dunnage material without occupational health risk exposure to operators or others located nearby the fumigation apparatus.

System control box 26 also includes power supply switches and circuits for operating heating source 18, mixing fans 28 and 30 and, as stated earlier, actuated butterfly valve 40 and contra-rotating fan 42. Interior lights 50 would also be controlled from the system control box 26. Such an arrangement provides a central and securable location for all electrically operated devices, which is important when sequential operational steps are required.

During use, dunnage and timber material for fumigation is loaded onto the sliding floor 34 and then inserted into the fumigation chamber 16 using gas-tight end doors 32 to provide access for the load. The end doors 32 are then sealed and heated toxic gases, generated by warming liquified fumigation reagent 20 by means of heating source 18, directly enter the fumigation chamber 16 via piping means 24. System control box 26 functions to control the flow of toxic gas into the fumigation chamber. As best illustrated in FIG. 2, the mixing fans 28 and 30 circulate gases within the fumigation chamber 16 when in use to provide good mixing of toxic gases with the charged material. When the fumigation interval is complete, the recirculation fans 28 and 30 are switched off, the flow of toxic gas into the chamber 16 is stopped and gas is evacuated from the fumigation chamber 16, flowing mM consecutively through orifice 38, pipe 36, actuated butterfly valve 40 and contra-rotating fan 42 before exiting the apparatus via pipe exhaust stack 44. As a safety check of the concentration of toxic gases remaining in the fumigation chamber 16, gas samples are drawn via a plurality of the gas sampling lines 48 to a gas flow meter test unit located within system control box 26 and a readout is obtained so that the operator may ascertain when it is safe to reopen end doors 32 and remove the dunnage and timber material from the sliding floor 34 after fumigation. At this point the apparatus is ready for a new load of material for fumigation and a repeat procedure.

Figure 3:
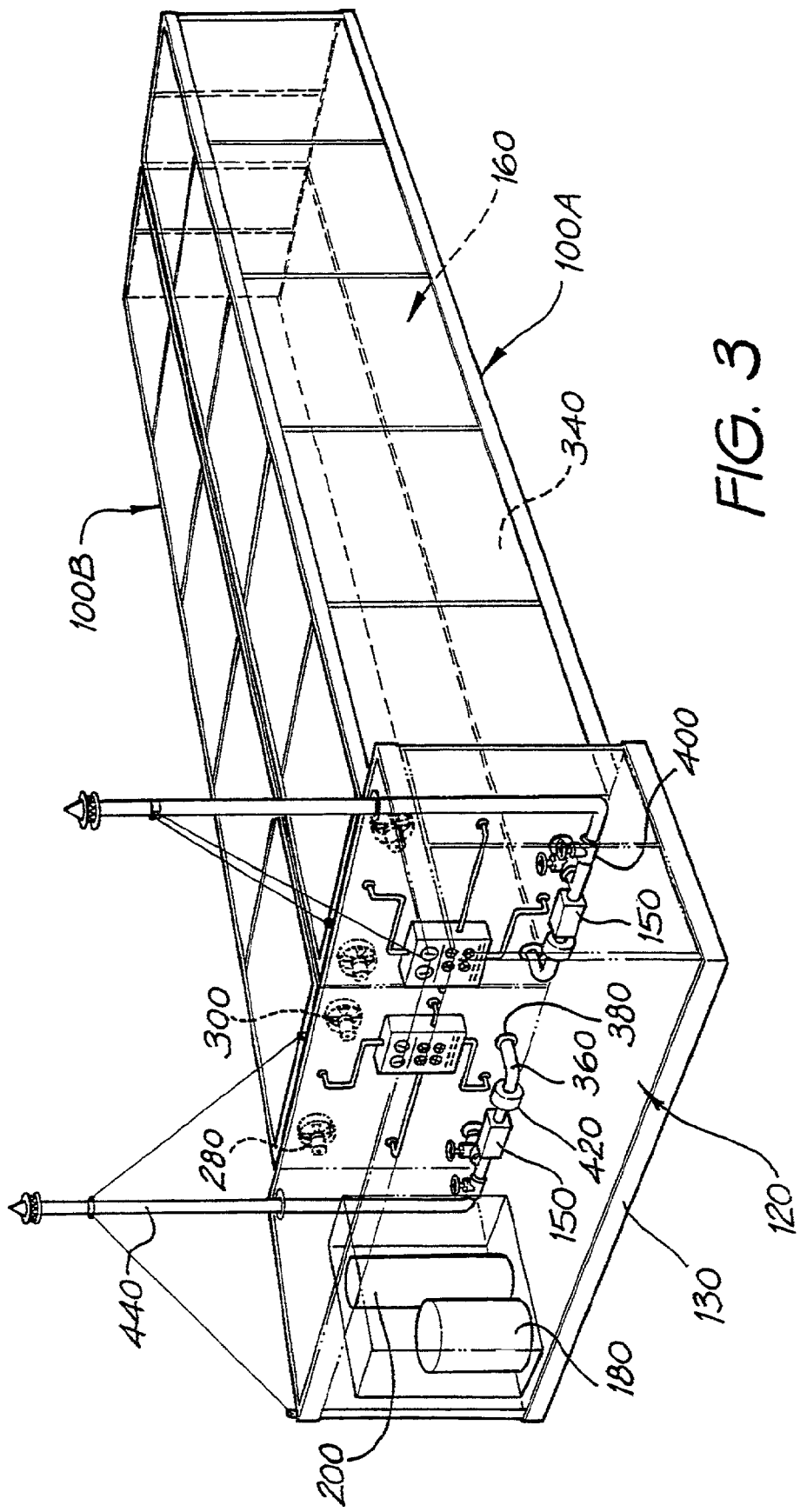
FIG. 3 is a perspective schematic view of another embodiment of the fumigation apparatus.

FIG. 3 depicts another embodiment of the fumigation apparatus including a pair of conventional forty (40) foot shipping containers 100A and 100B located alongside one another. In this particular construction of the invention the control room 120 is formed from a twenty (20) foot shipping container 130 located alongside adjacent ends of the forty (40) foot shipping containers 100A/B. In order to avoid repetition and for ease of reference similar components and features of this alternative embodiment of the invention has been designated with an additional "0", such as the control room 120.

In this other embodiment of FIG. 3 the fumigation apparatus includes absorption means in the form of an absorption bed such as 150 located downstream of the valve 400. The absorption bed 150 includes activated carbon to which the fumigant, in this example methyl bromide, attaches or is absorbed and is thus stripped from the gas/fumigant extracted from the fumigation chamber such as 160. Otherwise the extraction means is similar in construction to the preceding example of the fumigation apparatus.

The control room 120 of the twenty (20) foot container 130 is provided with the heating source or heat exchanger 180 and the source of fumigant, in this embodiment liquified methyl bromide. The piping means (not shown) which is located in a ceiling of each of the fumigation chambers such as 160 is operatively coupled to the heating source 180 and liquified fumigation reagent source 200.

The methyl bromide attaches to the activated carbon of the absorption bed 150 prior to discharge of the fumigant/gas mixture from the fumigation apparatus. The absorption bed 150 is periodically washed with a scrubbing solution, such as sodium thiosulphate. In this embodiment scrubbing of the absorption bed 150 with sodium thiosulphate yields bromide and sodium methylthiosulphate which are non-toxic salts which can be discharged safely to the environment. Thus, the methyl bromide gas is degraded following its fumigation and then extraction from the fumigation apparatus.

Now that several preferred embodiments of the present invention have been described in some detail it would be apparent to those skilled in the art that the fumigation apparatus has at least the following advantages over the admitted prior art;

1. The fumigation apparatus is adapted from a conventional shipping container and thus is relatively convenient and uncomplicated to fabricate;

2. The fumigation apparatus is relatively effective in fumigating produce; and

3. The fumigation apparatus is "environmentally friendly" in its fumigation and discharge of the fumigant.

Those skilled in the art will appreciate that the invention described herein is susceptible to variations and modifications other than those specifically described. For example, the source of fumigant need not be located in the fumigation apparatus but rather may be mounted on a mobile vehicle such as a utility truck. The invention need not be restricted to methyl bromide as the fumigant but rather extends to any substance which is suitable in fumigating produce and thus killing pests, parasites, insects, or vermin. The invention need not be restricted to the specific constructional features described and may for example not include the sliding bed or floor.

All such variations and modifications are to be considered within the scope of the present invention the nature of which is to be determined from the foregoing description.

The claims defining the invention are as follows:

1. A mobile fumigation system comprising:
    an ISO general purpose shipping container that includes a first compartment containing a fumigation chamber being adapted to contain cargo to be fumigated; and
    the shipping container further comprising a second compartment containing a fumigation apparatus operatively coupled to the fumigation chamber, the fumigation apparatus including:
    a fumigant inlet device for providing a flow of a toxic fumigant into the fumigation chamber;
    an extraction device for removing a majority of the toxic fumigant from the fumigation chamber; and
    an absorption device for absorbing the toxic fumigant removed from the fumigation chamber, the absorption device comprising an absorption bed including activated carbon effective for absorbing at least part of the toxic fumigant extracted from the fumigation chamber, the absorption device effective for preventing release of the toxic fumigant into atmosphere.

2. A mobile fumigation system, comprising:
    a fumigation chamber defined by at least one gas-tight ISO general purpose shipping container adapted to accommodate cargo to be fumigated, and
    a fumigation apparatus located in a separate container, wherein the fumigation apparatus is operatively coupled to the fumigation chamber of the at least one ISO gas-tight general purpose shipping container, the fumigation apparatus comprising:
a fumigant inlet device configured to flow a toxic fumigant into the fumigation chamber;
an extraction device configured to remove a majority of the toxic fumigant from the fumigation chamber; and
an absorption device configured to absorb the toxic fumigant removed from the fumigation chamber, the absorption device comprising an absorption bed including activated carbon effective for absorbing at least part of the toxic fumigant extracted from the fumigation chamber, the absorption device effective for preventing a release of the toxic fumigant into atmosphere.

3. The fumigation system of claim 2 further comprising a sliding bed or floor on which produce resides, the bed or floor being configured to slide into and out of the fumigation chamber wherein loading and unloading of the cargo to be fumigated can be performed externally of the chamber.

4. The fumigation system of claim 2 wherein the fumigation apparatus incorporates a source of the fumigant which is directly associated with a heating source, the heating source used to convert the fumigant into a gaseous form.

5. The fumigation system of claim 2 wherein the fumigant inlet device is adapted to detachably couple to a mobile source of the fumigant.

6. The fumigation system of claim 2 wherein the fumigation apparatus includes a system control box, a gas-tight fumigant supply source and a plurality of fumigant delivery pipes and valves effective for supplying fumigant from a supply source through a partition wall to the fumigation chamber.

7. The fumigation system of claim 6 wherein the fumigant inlet device is coupled to a dispersion pipe system located in the fumigation chamber.

8. The fumigation system of claim 6 wherein the system control box contains a fumigant sampling and detection meter unit and power supply switches for mixing fans, exhaust fan, lights, gas heaters and valve actuators.

9. The fumigation system of claim 2 wherein the fumigation chamber contains a plurality of floor and wall-mounted pipes independently connected via a system of taps and connectors to a fumigant sampling and detection meter unit located in the fumigation apparatus.

10. The fumigation system of claim 2 further comprising a device configured to wash at least part of the absorption bed with a chemical solution to remove and degrade the absorbed fumigant.

11. The fumigation system as defined in claim 10 wherein the solution comprises sodium thiosulphate for degrading methyl bromide.

12. The mobile fumigation system of claim 2 wherein the fumigation chamber includes a pair of shipping containers positioned alongside one another, each container operatively coupled to the fumigation apparatus.

13. The mobile fumigation system of claim 12 wherein the fumigant inlet device is adapted to detachably couple to a mobile source of the fumigant.

14. The mobile fumigation system of claim 12 wherein the fumigation apparatus incorporates a system control box, a fumigant supply source and a system of fumigant delivery pipes and valves adapted in use to supply fumigant from the supply source to the fumigation chamber.

15. The mobile fumigation system of claim 14 wherein the fumigant inlet device is operatively coupled to a dispersion pipe system located in the fumigation chamber.

16. The mobile fumigation system of claim 15 wherein the fumigation chamber contains a plurality of floor and wall-mounted pipes independently connected via a system of taps and connectors to a fumigant sampling and detection meter unit located in the separate container.

17. A mobile fumigation system comprising:
an ISO general purpose shipping container that includes a first gas-tight compartment including a fumigation chamber being adapted to contain cargo to be fumigated;
the shipping container further comprising a second compartment including a fumigation apparatus operatively coupled to the fumigation chamber, and
a partition wall separating the first compartment and the second compartment, wherein the fumigation apparatus includes:
a fumigant inlet device operatively coupled to the fumigation chamber through the partition wall to allow a flow of a toxic fumigant into the fumigation chamber;
an extraction device operatively coupled to the fumigation chamber and arranged to remove a majority of the toxic fumigant from the fumigation chamber; and
an absorption device operatively coupled to the extraction device, the absorption device comprising an absorption bed including activated carbon effective for absorbing at least part of the toxic fumigant extracted from the fumigation chamber, the absorption device effective for preventing a release of the toxic fumigant into atmosphere.

\* \* \* \* \*